United States Patent [19]

Crofts, Sr.

[11] Patent Number: 4,550,692
[45] Date of Patent: Nov. 5, 1985

[54] COOLING SYSTEM

[75] Inventor: John G. Crofts, Sr., Columbus, Ind.

[73] Assignee: Cummins Engine Company, Inc., Columbus, Ind.

[21] Appl. No.: 579,396

[22] Filed: Feb. 13, 1984

[51] Int. Cl.⁴ .......................... F02B 29/04; F01P 3/12
[52] U.S. Cl. ................................ 123/41.1; 123/41.31
[58] Field of Search ............... 123/41.01, 41.02, 41.31, 123/563, 41.09, 41.1; 60/599

[56] References Cited

U.S. PATENT DOCUMENTS

| 3,134,371 | 5/1964 | Crooks | 123/563 |
| 3,397,684 | 8/1968 | Scherenberg | 60/599 |
| 3,425,400 | 2/1969 | Scherenberg | 123/41.31 |
| 3,483,854 | 12/1969 | Foran et al. | 123/41.31 |
| 3,863,612 | 2/1975 | Wiener | 123/41.08 |
| 4,180,032 | 12/1979 | Plegat | 123/563 |
| 4,325,219 | 4/1982 | Stang et al. | 60/599 |
| 4,348,991 | 9/1982 | Stang et al. | 60/599 |

Primary Examiner—William A. Cuchlinski, Jr.
Attorney, Agent, or Firm—Newman, Williams, Anderson & Olson

[57] ABSTRACT

An engine cooling system wherein coolant is circulated through a circuit including an engine, a radiator and an aftercooler. Means are provided for automatically regulating the temperature of the coolant passing through the aftercooler. Greater cooling is achieved in the aftercooler by utilizing the natural occurrence of low temperature coolant in the bottom tank of a conventional radiator during the most frequently prevailing operating conditions.

7 Claims, 2 Drawing Figures

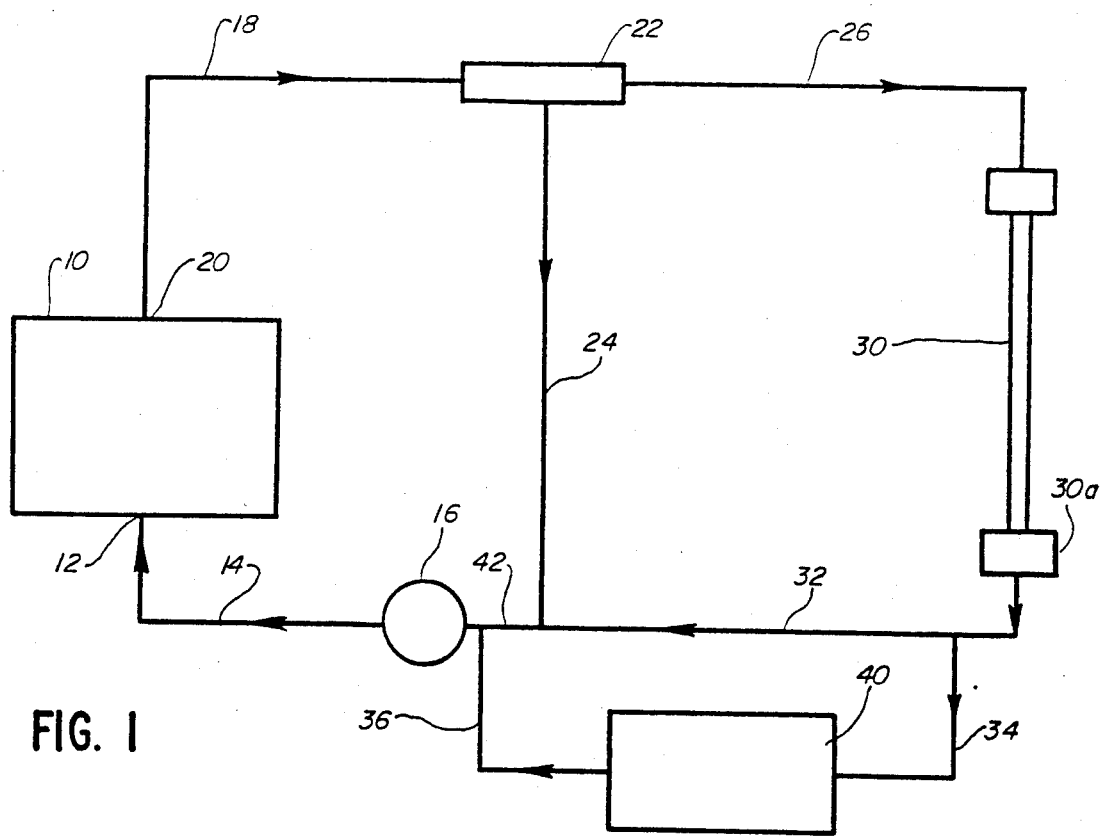
FIG. 1
FIG. 2
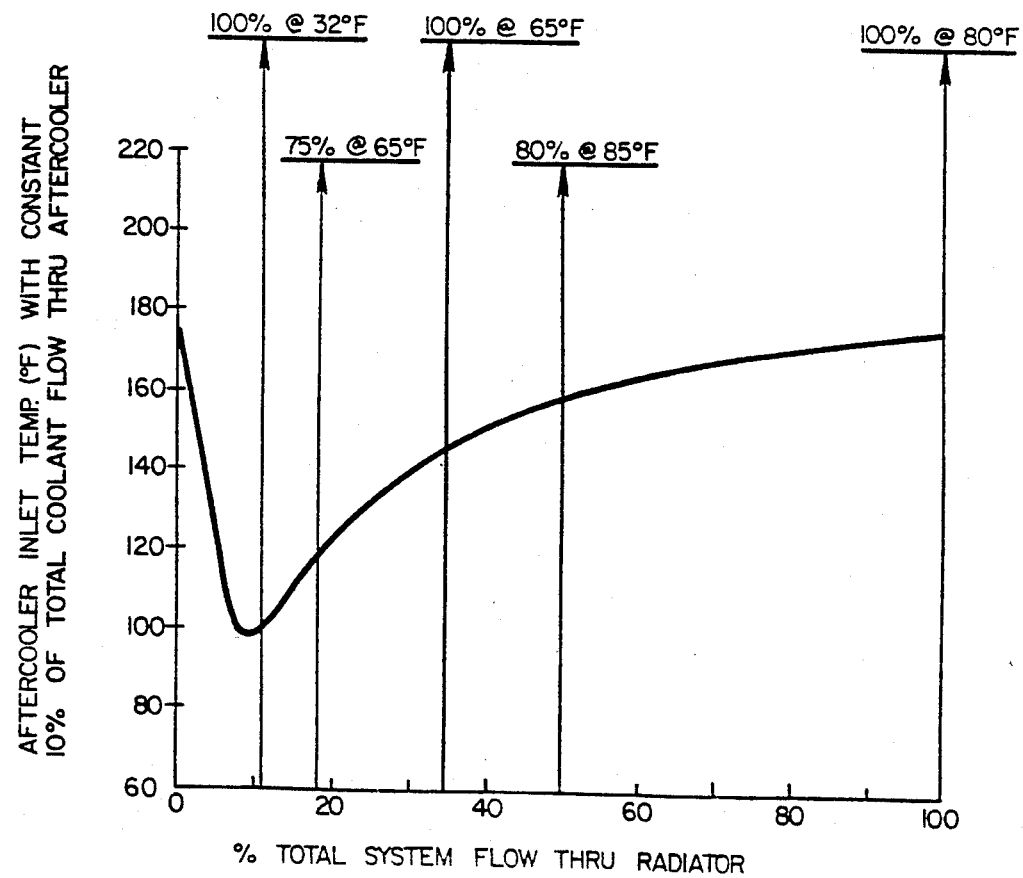

COOLING SYSTEM

This invention relates to a cooling system for internal combustion engines and more particularly to a cooling system wherein coolant is circulated through the engine, an aftercooler and radiator.

It is known in the art to employ water-cooled aftercoolers to remove heat from the manifold intake air. For example, U.S. Pat. No. 4,325,219 relates to an engine coolant system which includes an aftercooler. Control of intake air temperature is desirable from an engine performance standpoint and for controlling engine emissions, for example, to cool the intake air during high temperature operation to control nitrogen oxide emissions and to heat the intake air during low temperature operation to control unburnt hydrocarbons. Typically, an aftercooler is employed in a cooling system in such manner that water leaving the engine at a relatively high temperature flows to the aftercooler while by-passing the radiator. This arrangement provides less than maximum cooling effectiveness for the manifold air intake.

The present invention has for a primary object the provision of a cooling system including an aftercooler wherein the temperature of the water entering the aftercooler is regulated.

A further object of the invention is to provide an engine cooling system wherein coolant at a lower temperature than usual flows through the aftercooler to increase cooling effectiveness.

The present invention relates to a cooling system for internal combustion engines wherein increased cooling is achieved to realize lower manifold air intake temperatures. The invention provides an engine cooling system wherein coolant is circulated through a circuit including an engine, a radiator and an aftercooler. Means are provided for automatically regulating the temperature of the coolant passing through the aftercooler. Greater cooling is achieved in the aftercooler by utilizing the natural occurrence of low temperature coolant in the bottom tank of a conventional radiator during the most frequently prevailing operating conditions.

The features and advantages of the invention are further illustrated by the following description taken in conjunction with the accompanying drawings wherein:

FIG. 1 is a schematic view of a cooling system in accordance with the present invention.

FIG. 2 is a graphical representation showing typical results achieved with a cooling system in accordance with this invention.

With reference to FIG. 1, numeral 10 designates an internal combustion engine such as, for example, a truck diesel engine. A coolant is passed to an inlet 12 on the engine whereby cooling of the engine is accomplished. It is to be understood that suitable passages are provided within the engine for passing coolant through the various parts of the engine, such as the block and head, as is conventional. Coolant is introduced into the inlet 12 via conduit 14 by means of pump 16. A conventional water pump of the variable speed type wherein the speed is dependent upon engine revolution speed (rpm) is preferred. Line 18 connects with an engine outlet 20 and a flow control valve or thermostat 22 is connected in the line 18. Leading from the thermostat 22 are two lines, a radiator by-pass line 24 and radiator inlet line 26. Radiator inlet line 26 extends from the thermostat to radiator 30 while by-pass line 24 connects with radiator return line 32 at a location upstream of pump 16. Line 34 connects in series arrangement with radiator return line 32 and aftercooler 40. Another line 36 connects the aftercooler 40 with radiator return line 32 at a location downstream of the point where radiator by-pass line 24 connects with radiator return line 32. Disposed within radiator return line 32 is a flow-controlling device such as a line orifice insert. The flow-controlling device can include various types of flow-control devices known to the art such as, for example, a sharp-edged orifice, a streamlined orifice, a simple venturi tube, a differential venturi tube and the like. The flow-control device is disposed within radiator return line 32 at a location indicated by the numeral 42 which is between the points at which by-pass line 24 and aftercooler outlet line 36 connect with the radiator return line 32.

From the above description it is seen that the aftercooler 40 is incorporated in the cooling system in series with the radiator 30. The advantages of this arrangement will be further apparent by considering the cooling system in operation. Thus, when the engine is just started and warming up, the coolant is pumped by pump 16 into and through the engine 10 and from the engine through line 18 to the thermostat 22. Since at this stage the coolant is at a relatively low temperature, usually below the switching temperature of the thermostat, the thermostat remains in closed position and directs the coolant through radiator by-pass line 24. With such flow, the coolant by-passes the radiator and is not cooled thereby, which facilitates warm-up of the engine. As long as the temperature of the coolant flowing from the engine is below the operating range of the thermostat it will remain closed and restrict flow to the radiator thereby maintaining desired engine temperature. With very little or no flow through the radiator, the temperature of the coolant in the bottom tank 30a of the radiator is relatively low as compared with the temperature of the coolant leaving the engine. It has now been found quite advantageous to utilize the low temperature radiator water in the aftercooler to provide additional cooling and thus lower the temperature of the air entering the manifold.

The flow-control means disposed within the radiator return line 32 has a direct effect on the amount of the system's coolant flow which passes through the aftercooler 40. The greater the flow resistance afforded by the flow-control means at 42, the greater the flow is through the aftercooler. Thus, for example, if a line orifice flow control is employed, a smaller size flow orifice results in a higher flow resistance therethrough and therefore a higher percentage of the coolant passing through the aftercooler. The flow capacity of the aftercooler 40 determines the amount of low temperature coolant from the radiator 30 which can be passed therethrough. With a higher flow-through capacity aftercooler a greater amount of low temperature coolant from the radiator can be passed therethrough. The flow-through capacity of the radiator 30 and aftercooler 40 as well as the pump capacity can be selected so as to insure that a desired amount of low temperature coolant from the radiator is passed through the aftercooler at any given thermostat setting. When the flow-through capacity of the aftercooler is small in comparison to that of the radiator, the major proportion of flow through the aftercooler is low temperature coolant from the radiator. With such a relationship, greater cooling is achieved in the aftercooler, thus providing lower manifold air intake temperatures. On the other hand, when the flow-through capacity of the aftercooler is high in relation to that of the radiator, flow from the radiator may be insufficient to satisfy the flow capacity of the aftercooler, and in such case a greater amount of the hotter coolant from by-pass line 24 is caused to pass through the aftercooler. Such a flow pattern provides less cooling in the aftercooler with corresponding rise in manifold air intake temperature. As long as the thermostat is opened far enough to cause the radiator flow to be large enough to completely supply the aftercooler, the aftercooler inlet temperature will be substantially the same as the temperature of the coolant flowing from the bottom of the radiator. If the thermostat reduces the radiator flow to a level below the aftercooler flow rate, the aftercooler coolant flow will be a mixture of cool radiator water and warmer by-pass water. Thus, the aftercooler coolant inlet temperature, and therefore intake manifold temperature, depends on the setting of the thermostat in the coolant system. The heat flow rates through the various elements of a conventional liquid-cooled diesel engine system are typically such that coolant flow through the aftercooler is adequate at about 10% to 15% of the total coolant flow through the system.

Depending upon the temperature of the coolant flowing from the engine to the thermostat, the thermostat will be in either a fully opened or closed position or in an intermediate position. When the thermostat is in a closed or substantially closed position, such as is normally the case during engine operation under low load conditions or at low ambient temperatures, flow from the thermostat through line 26 to the radiator is very low or substantially non-existent. Under such conditions the coolant flow through the radiator will usually be less than the flow-through capacity of the aftercooler so that hotter coolant from the by-pass line 24 will be directed to the aftercooler. When the thermostat is in fully closed position, substantially all of the flow through the aftercooler is provided by the radiator by-pass flow. Conversely, when the engine is operating under greater load conditions or at higher ambient temperatures with higher engine temperature, the thermostat switches to a more open position which results in a greater amount of flow being directed to and through the radiator. The greater flow through the radiator in turn results in a proportionally greater amount of low temperature coolant flowing from the radiator to the aftercooler. This increases the cooling provided by the aftercooler. The temperature of the coolant passing through the aftercooler can be as much as 60° to 70° F. lower when the coolant flow from the radiator equals or slightly exceeds aftercooler capacity than would be the case if coolant were not passed directly from the radiator to the aftercooler.

FIG. 2 is a graphic representation showing typical results as to the temperature of coolant entering the aftercooler versus different percentage of coolant flow through the radiator at various engine loads and operating temperatures. Data is plotted with respect to various percentages of engine load at various temperatures, e.g. 100% at 32° F., etc. For a mean operating load factor of 70% and a mean ambient temperature of 60° F., the optimum operating condition is to have about 10-15% of the total coolant flow pass through the radiator. Under these conditions, the temperature of coolant entering the aftercooler is lowest, thus providing maximum cooling for the intake manifold air.

The significant advantages of the invention are that during the majority of operating conditions normally encountered, additional cooling is provided by the aftercooler without any other changes being required for the radiator, water pump, thermostat, etc. of the conventional cooling system.

Those modifications and equivalents which fall within the spirit of the invention are to be considered a part thereof.

What is claimed is:

1. A cooling system for an internal combustion engine comprising an engine having a liquid coolant inlet and a liquid coolant outlet; a liquid coolant pump having an outlet connected to the engine inlet; a thermostatically controlled valve having an inlet connected to the engine outlet and first and second outlets, the setting of said valve being dependent upon the temperature of the coolant leaving said engine outlet; a radiator having an inlet connected to the valve first outlet and an outlet connected by a first flow line to an inlet of said pump; a by-pass flow line interconnecting the valve second outlet with the said first flow line at a first location upstream of said pump inlet; an aftercooler having an inlet connected to the said first flow line at a second location upstream of said first location and an outlet connected to the said first flow line at a third location downstream of said first location and upstream of said pump inlet; and flow-control means disposed within the said first flow line intermediate said first and third locations.

2. The cooling system of claim 1 wherein the pump is a variable speed type and the speed thereof is dependent upon revolutions per minute of the engine.

3. A system according to claim 1 wherein means are provided for passing from about 10 to 15% of the total coolant flow through the aftercooler.

4. A system according to claim 1 wherein a thermostatically controlled valve is included in the system in such manner that the setting of the said valve affects the amount of coolant flow from the radiator passed through the aftercooler.

5. A system according to claim 1 wherein flow-control means is incorporated in the system to regulate the amount of coolant flow from the radiator passed to the aftercooler.

6. A system according to claim 5 wherein the flow-control means is a venturi flow orifice.

7. A system according to claim 1 wherein the flow-control means is a line orifice control means.

* * * * *